United States Patent [19]
Shimizu et al.

[11] Patent Number: 5,950,468
[45] Date of Patent: Sep. 14, 1999

[54] RESIN FILM LAMINATED STEEL SHEET FOR CAN BY DRY FORMING

[75] Inventors: Keiichi Shimizu, Hikari; Humio Kunishige, Kudamatsu; Junichi Tanabe, Yanai; Atsuo Tanaka, Tokuyama, all of Japan

[73] Assignee: Toyo Kohan Co., Ltd, Tokyo, Japan

[21] Appl. No.: 08/890,117

[22] Filed: Jul. 9, 1997

Related U.S. Application Data

[62] Division of application No. 08/301,844, Sep. 7, 1994, Pat. No. 5,686,194.

[30] Foreign Application Priority Data

Feb. 7, 1994 [JP] Japan ........................................ 6-33225

[51] Int. Cl.$^6$ .............................. B21B 45/02; B21B 45/00
[52] U.S. Cl. ..................................... 72/41; 72/46
[58] Field of Search ................... 427/209, 210, 427/211, 405, 409; 428/626, 667; 72/41, 42, 46, 47; 205/283; 148/320

[56] References Cited

U.S. PATENT DOCUMENTS

| | | | |
|---|---|---|---|
| 4,450,977 | 5/1984 | Colburn et al. | 72/46 |
| 4,466,842 | 8/1984 | Yada et al. | 148/12 R |
| 4,762,245 | 8/1988 | Matsubayashi et al. | 220/269 |
| 5,139,580 | 8/1992 | Freier et al. | 148/547 |
| 5,191,779 | 3/1993 | Imazu et al. | 72/46 |
| 5,360,649 | 11/1994 | Sato et al. | 428/35.8 |

Primary Examiner—Joseph J. Hail, III
Assistant Examiner—Rodney Butler
Attorney, Agent, or Firm—Fulbright & Jaworski, LLP

[57] ABSTRACT

A steel sheet of which both sides are laminated with a resin film wherefrom a two-piece can having a can height about twice the length of the can diameter and a thin wall thickness from 40 to 70% of the original sheet thickness can be formed under a special wall thickness reduction process without water based coolant or lubricant.

1 Claim, 3 Drawing Sheets

RESIN FILM LAMINATED STEEL SHEET FOR CAN BY DRY FORMING

This is a Division Application of application Ser. No. 08/301,844, filed Sep. 7, 1994, now U.S. Pat. No. 5,686,194.

FIELD OF THE INVENTION

The present invention relates to a metal sheet of which both sides are laminated with a thermoplastic resin film suitable for the production of a two-piece can having a thin wall thickness formed under a wall thickness reduction process including ironing without use of water based coolant or lubricant.

BACKGROUND AND OBJECTIVE

The two-piece cans are generally DRD (drawn and redrawn can) and DWI (draw and wall ironed can) produced from tin plated steel sheet, aluminium sheet, aluminium alloy sheet or ECCS (electrolytically chromium coated steel), and DTR (drawn thin-redrawn can) is recently put to practical use. DRD has a rather thick wall thickness which becomes thicker in proportion to the can height due to drawing and redrawing. It is then used for a can having a rather low can height from a view point of economy. The materials used for DRD are ECCS, tin plated steel sheet or aluminium alloy sheet. On the other hand, DWI can economically be applied for a can having high can height because the wall thickness can be reduced to one third of that of the original sheet. The material presently used for DWI are tin plated steel sheet or aluminium alloy sheet. But there is great difference between DRD and DWI in respect that the former formed by drawing is made of a metal sheet precoated with an organic coating while the latter formed by ironing is coated after forming. This is attributed to that the processing intensity and the state of stress at the processing are greatly different between DRD and DWI. The application of a metal sheet covered with an organic coating for DWI where the processing intensity (reduction ratio) and the surface pressure to the can wall is extremely great has not yet been put to practical use because of the seizing of the organic coating to the dies or the damage of the organic coatings on the outer and the inner surface of the can.

On the other hand, DTR (drawn and thin-redrawn can) is formed by thinning the can wall which includes bending and bending-back at the corner of drawing dies having a small corner radius and applying a heavy tensile stress. DTR which is formed by the forming resembling drawing has a little thinner can wall thickness than that of the original sheet because the can wall is stretched. In addition, the heavy surface pressure is not applied to the can wall lying between the dies and the punch in the DTR process unlike in the ironing process, then the surface pressure applied is not so heavy and the organic coating is hardly damaged, and then a metal sheet covered with an organic coating can be applied to DTR and ECCS covered with a thermoplastic resin film is industrially used at present. But in the DTR process the can wall is apt to break during the forming because it is mainly formed with a tensile stress, then the wall thickness can only be about 80% of that of the original sheet and is thicker than that of DWI.

As described above, there are advantage and disadvantage in DRD, DWI or DTR, and in the processing of them. Thereupon the objective of the present invention lies in producing a steel sheet of which both sides are laminated with a thermoplastic resin film suitable for the production of a can having a can height about twice the can diameter and a thin wall thickness from 40 to 70% of the original sheet thickness like DWI. The most important objective lies in producing a steel sheet laminated with a thermoplastic resin film which can be formed into a can without the use of emulsion or water soluble lubricant presently used for cooling and lubrication in DWI process. The use of a steel sheet previously laminated with a thermoplastic resin film can omit the coating and baking process in the can producing process, then prevent the difusion of solvent, and then omit the next rinsing, drying and waste water disposal process. There has not been a disclosure relating to a metal sheet laminated with a thermoplastic resin film wherefrom a can having a high can height and a thin wall thickness can be produced without such a water based coolant or lubricant, nor such a can or the process of producing it. However, there are the following disclosures relating to the present invention of which the objective is different from that of this invention.

Laid-Open Japanese Patent Publication No. Sho. 62-275172 shows a metal sheet covered with an organic coating for a two-piece can and the objective of it lies in increasing the retention of coolant (water based cooling and lubricating agent) at the outer surface of a can in DWI process. Namely, it depends on the use of a water based cooling and lubricating agent, then it is different from that of the present invention. Also, WO89/03303 shows a metal sheet for DWI of which one or each side is covered with a polyester resin film, and it also depends on the use of a water based cooling and lubricating agent in the same manner as above-described publication. Also, Laid-Open Japanese Patent Publication No. Hei. 4-91825 shows a metal sheet covered with a thermoplastic resin wherefrom a can having a thin wall is formed by bending and bending-back with a lubricant which volatilizes at a high temperature but without a water based cooling and lubricating agent. It relates to DTR, but as shown in its Examples the reduction rate of the can wall thickness is about 20% and smaller than the goal reduction rate of the present invention.

In the present invention the can height becomes higher in proportion to the increase of the reduction rate of the can wall thickness from 40 up to 70%. This serves the aim of the present invention, but the greater the reduction rate of the can wall thickness is, the more likely the seizure of the outer can wall to the dies and the damage of the resin layer or the break of the wall are. Due to the absence of water based cooling and lubricating agent, the prevention of damage of the resin layer on the outside can wall and the break of the can wall due to it is the most important objective. In addition, it is another important objective to provide enough adhesive strength between the steel sheet and the laminated resin layer because it decreases in proportion to the processing intensity.

SUMMARY OF THE INVENTION

The objective of the present invention is producing a steel sheet laminated with a thermoplastic resin, wherefrom a two-piece can having a thin wall thickness is easily formed by dry forming, and the can has an enough pressure proof strength, corrosion resistance and adhesive strength between the steel sheet and the laminated resin layer after forming. In order to improve the formability in the dry forming and accomplish the aimed strength of the can according to the present invention, the chemical composition, the other mechanical and physical characteristics and the surface profile of the used steel sheet are defined within a preferred range. Also, the steel sheet is electrolytically treated in the chromate solution in order to provide enough adhesive strength between the steel sheet and the laminated resin layer. The thermoplastic resin is preferably a polyester resin, more preferably a polyethylene terephthalate or a co-polyester resin mainly composed of ethylene terephthalate unit, having a thickness from 10 to 30 μm and a melting temperature from 180° to 260° C. The excellent formability in the dry forming and corrosion resistance can be accomplished by defining these factors within a preferred range.

In addition, the coating of a lubricant which volatilizes at a high temperature on the surface of the laminated resin layer can improve the formability in the dry forming, and the lubricant can be rejected by heating the can after the forming, and then degreasing, rinsing or drying process can be omitted. It is also preferable to apply a suitable forming process for the present invention in order to practice the dry forming at high reduction ratios without any trouble. The application of a composite process composed of a drawing and an ironing under a specified condition, that is wall thinning process where the resin laminated on both sides of a can is not damaged and the can wall does not break to the resin laminated steel sheet of the present invention can more effectively accomplish the objective of the present invention.

The laminated steel sheet of the present invention is suitable for use in the dry forming process disclosed in U.S. application Ser. No. 08/890,117 filed concurrently herewith.

DETAILED DESCRIPTION OF THE INVENTION

Figure 1:
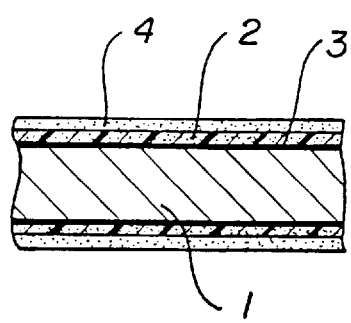
FIG. 1 shows a cross sectional drawing of the resin laminated steel sheet of the present invention.
Figure 3:
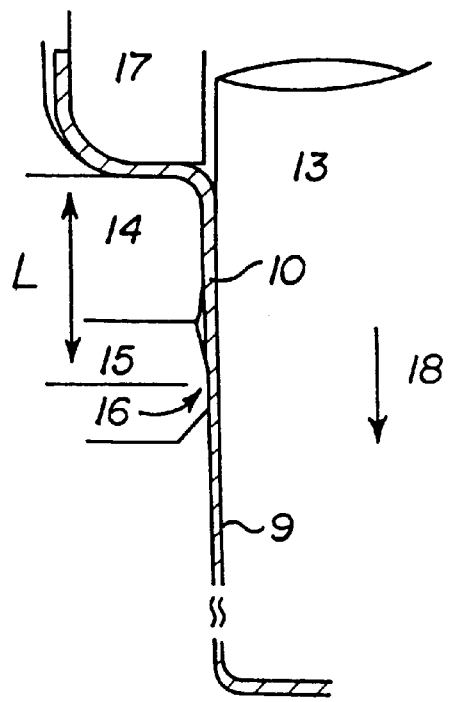
FIG. 3 shows a part of a cross sectional drawing showing the composite process composed of drawing and ironing suitable for producing a can having a thin wall and a high can height by dry forming from the resin laminated steel sheet of the present invention.

In the present invention, as shown in FIG. 1, a steel sheet 1, covered with a layer 3 composed of an upper layer of hydrated chromium oxide and a lower layer of metallic chromium, of which both sides are laminated with a thermoplastic resin 2 coated on the one side of it with a lubricant 4 which volatilizes at a high temperature, has to be reduced to a thin gauge by dry forming with high reduction ratio. The difficulties such as heat generated due to processing, softening or melting of the laminated resin due to the generated heat, resultant direct contact of the base steel with the forming dies and the break of can wall have to be surmounted. The heat generated due to processing is based on the deformation of the steel sheet and the friction. The heat generation based on the deformation decreases when the processing intensity and the deformation resistance is light, and in the ironing of the composite process of the present invention, the heat generation due to friction, in proportion to (surface pressure)×(friction coefficient) decreases when the deformation resistance is light. In addition, when the resin is heated, the damage of the laminated resin layer diminishes when the surface pressure is light. Then, the damage of the resin layer diminishes when the processing intensity is light and the deformation resistance is as little as possible. As the laminate is drawn and redrawn before it is ironed as shown in FIG. 3, it is desirable that the work hardening is as little possible. For this reason the chemical composition, the crystal grain size and the aging index of the steel sheet are defined.

At first, the reason why the chemical composition of the steel sheet is defined is described below. Carbon makes steel hard and makes crystal grain fine. When the crystal grain is fine, the surface is hardly roughened by forming, that is preferable for the adhesion to the laminated resin but the work hardening increases. As the hardening of the steel is undesirable for the dry forming of the present invention, the upper limit of carbon quantity is defined as 0.1%. On the other hand, when carbon quantity is less than 0.001%, the work hardening is light, but the crystal grain becomes large and the rough surface is apt to be caused during the redrawing and ironing process which are essential in the present invention, then the adhesive strength to the resin layer decreases, and then the stress concentration due to the rough surface is caused and the can wall is apt to break during the forming.

Manganese, which also hardens steel, is less than 0.5%. On the other hand, manganese is necessary to prevent the hot brittleness due to sulfur contained in the steel, then the lower limit of it's quantity is defined as 0.05%.

Aluminum is added as a deoxidizer, but the balanced deoxidizing can not be accomplished when the residue after deoxidizing is less than 0.015%. On the other hand, when the quantity of aluminum is more than 0.13%, the steel hardens and the cost also increases. The increase in the quantity of sulfur deteriorates the formability based on the increase of the sulfur based inclusion and also makes the corrosion resistance poor, so the upper limit is 0.03%.

Silicon and phosphorus either make steel hard or deteriorate the dry forming essential for the present invention, so the upper limit of their quantity are defined as 0.05 and 0.03%, respectively.

Titanium and niobium are added in order to decrease the quantity of solid dissolved carbon and nitrogen contained in the steel and so limit the work hardening. When the quantity of them is less than the lower limit, their effects are unsatisfactory. When the quantity of them is more than the upper limit, the crystal grain becomes fine, causing increased work hardening which is unsuitable for the dry forming. When the quantity of carbon is in the range preferably from 0.001 to 0.03%, more preferably 0.001 to 0.01%, the addition of titanium and niobium is more effective. The quantity of nitrogen, which is undefined, is preferably less than 0.005%. The reduction effect of the solid dissolved carbon and nitrogen due to the addition of titanium and niobium can be evaluated by the aging index described later.

Secondly, the crystal grain size of the steel is defined in the range from 6 to 30 μm. The steel having smaller crystal grain size is not apt to have a rough surface caused by the forming and good adhesion to the laminated resin is obtained, but it causes heavy work hardening and deteriorates the formability in the dry forming essential for the present invention. In the present invention, as the thickness of the resin laminated steel sheet in the can wall is reduced to 40 to 70% of the original thickness, the blank diameter defined due to the fixed can height can be smaller than that of DTR. Then, as the drawing ratio (blank diameter/diameter of finished can) can be small, the rough surface is hardly caused, and it is unnecessary to make the crystal grain size small, unlike that for DTR. On the contrary, the steel having smaller crystal grain size is undesirable because it causes heavier work hardening and deteriorates the formability in the dry forming. But the steel having crystal grain size of more than 30 μm is apt to cause the rough surface even if the aforementioned drawing ratio is small, and also causes the unsatisfactory adhesion to the laminated resin layer and the break of the can wall. For the reason described above, the upper and lower limit of the crystal grain size of the steel is defined, and steel having the crystal grain size from 8 to 15 μm is more preferable for the objective of the present invention. The crystal grain size of the steel can be controlled by aforementioned chemical composition of the steel, finish temperature in hot rolling, coiling temperature after hot rolling and modifying condition of recrystallization after cold rolling.

The reason why the aging index is defined less than 5 kg/mm$^2$ is now described. The aging index is in proportion to the solid dissolved carbon and nitrogen contained in the steel and the increase of them causes heavier work hardening. The aging index substitutes for the solid dissolved carbon and nitrogen. It is defined less than 5 kg/mm$^2$ to limit the work hardening. The aging index is shown by the difference of the yield strength of the steel, which is deformed in the elongation of 8 to 10%, before and after the heating it for 1 hour at 100° C. It can be controlled by cooling temperature after hot rolling, cooling rate after recrystallization annealing, addition of titanium and niobium and so on.

If the finish can is positively or negatively pressurized in use, then the can bottom and can wall should have strength in order to endure such a pressure. In particular, when a can is positively pressurized, the pressure proof strength of the can bottom is critical. As the pressure proof strength is roughly in proportion to (sheet thickness)$^2$×(yield strength), it depends on the sheet thickness and the yield strength. The required pressure proof strength also depends on the content in the can. The lower limit of the yield strength, the tensile strength and the thickness of the steel sheet are defined based on the pressure proof strength. On the other hand, the upper limit of the yield strength and the tensile strength are defined based on the damage degree of the laminated resin layer during the ironing. Based on these conditions, the yield strength and the tensile strength of the steel sheet applied for the present invention are defined from 25 to 70 kg/mm$^2$ and from 25 to 73 kg/mm$^2$, respectively. When they are in the range more than the upper limit, the can wall is apt to break due to the damage of the resin layer. Also, the yield ratio, represented by (yield strength/tensile strength), is defined from 0.7 to under 1 because the higher yield strength which affects the can bottom strength and the lower deformation resistance in the processing which affects the damage of the resin layer during the ironing are preferable for the objective of the present invention. The upper limit of the steel sheet thickness is defined as 0.3 mm based on the pressure proof strength of the formed can (that of more than 0.3 mm is scarcely required) and also on the decrease in cost. With a steel having higher yield or tensile strength, the thickness of it can be reduced because the formed can has enough pressure proof strength. With a steel having higher yield strength, the thickness of it is preferably thin as much as possible (as far as the formed can has enough pressure proof strength). In addition, in case where the processing intensity is the same, with a thinner steel sheet the total deformation and the heat generation in the processing can be reduced. The lower limit of the steel sheet thickness is defined as 0.15 mm based on aiming at the stably continuous and high-speed production of the steel sheet having an uniform thickness, but it may not be defined.

Then, the resin 2 shown in FIG. 1, which is laminated to the steel sheet, is a thermoplastic resin, preferably a crystalline polyester having a thicness in the range from 10 to 50 μm and a melting temperature of 180 to 260° C. In the dry forming based on the present invention, the thermoplastic resin, applied as a resin to be laminated to the steel sheet, can make the lubrication effect during the ironing more effective. It is softened by the heat generated by the friction between the outside surface of a can and ironing dies during the ironing process, then the lubrication effect is supposed to be performed. The higher the temperature of the dies goes up, the more effectively the lubrication effect is performed. However the higher the temperature of the dies goes up, the further the resin in the ironing dies is softened, then the resin is damaged by the surface pressure in proportion to the deformation resistance of the steel sheet. When the steel sheet directly contacts the ironing dies, the can wall breaks. Therefore, the excessive softening of the thermoplastic resin is not preferable and the temperature of the ironing dies is preferably kept within a suitable range, more preferably from 25° C. to the glass transition temperature of the laminated thermoplastic resin. Also, the thermoplastic resin which is softened at a low temperature is not preferable and that having a melting temperature (it is used as an index represents the softening sensitivity) higher than 180° C. is preferably applied because it improves the formability by the dry forming which is the objective of the present invention. In the industrial production, the drawing and the ironing are successively practiced and the temperature of the can wall sometimes goes up above 100° C. At that time, with a thermoplastic resin having a lower melting temperature, it is softened or melts, then the appearance of the formed can is damaged, or the steel is exposed in the can, and then the corrosion resistance is deteriorated. And the thermoplastic resin seizes on the forming tools, then the continuous production can not be performed. For this reason the thermoplastic resin has a melting temperature higher than 180° C. On the other hand, with that having a melting temperature higher than 260° C., the sufficient lubrication due to the softening of the resin during the forming is not applied. For these reasons described above, the melting temperature of the thermoplastic resin is preferably defined from 180 to 260° C. And the thickness of the thermoplastic resin laminated to the steel sheet is defined from 10 to 50 μm. If the resin thickness is less than 10 μm, there is a possibility that the ironing dies directly contact the steel sheet on the outside surface of the can during the ironing and then the can wall breaks. There is also a possibility that the corrosion resistance on the inner surface of the can is reduced. In addition, it is hard to laminate the thermoplastic resin to the steel sheet continuously and uniformly. The upper limit of the resin thickness is defined as 50 μm based on the avoidance of wrinkles caused during the drawing and also on the decrease in cost.

Among the thermoplastic resins having a melting temperature of 180 to 260° C., a polyester resin, especially polyethylene terephthalate, polyebutylene terephthalate, a co-polyester resin mainly composed of ethylene terephthalate unit or a polyester resin composed of a mixture of these resins are preferably applied for the present invention. In particular, a co-polyester resin composed of 75 mole % of polyethylene terephthalate and 25 mole % of polyethylene isophthalate, polyethylene sebacate or polyethylene adipate, or a polyester resin composed of polyethylene terephthalate or above-mentioned polyester resin blended with polyebutylene terephthalate.

The above described polyester resin can be laminated to the steel sheet by the following method:

(1) A melted polyester resin is directly extruded on both sides of a steel sheet.

(2) A non-oriented or oriented polyester resin film produced in the ordinary skill is thermally laminated to both sides of a steel sheet.

(3) Above-mentioned non-oriented or oriented polyester resin film is laminated to both sides of a steel sheet by laying an adhesive between the resin film and the steel sheet.

(4) The use of these methods in combination.

All these methods can be applied to the production of the resin laminated steel sheet of the present invention, but a biaxially oriented polyester resin film is preferably applied based on such required characteristics of the formed can as the impact resistance of the laminated resin layer and the permeation resistance against the corrosive content. In such a case, it is preferable to laminate a biaxially oriented polyester resin film to a steel sheet in order that the innermost layer (directly contacts a steel surface) of the resin film has a planar orientation coefficient of 0.00 to 0.05 and the outermost (the furthest from a steel surface, then it is free) layer of the resin film has that of 0.01 to 0.10 in the laminated resin film. When the planar orientation coefficient at the innermost layer is more than 0.05, the laminated resin film is apt to peel off during the processing, then it is not practical. On the other hand, in case where the planar orientation coefficient at the outermost layer is less than 0.01, the biaxial orientation in the whole resin film has almost disappeared. When the steel sheet laminated with such a resin film is processed into a drawn and ironed can by dry forming, cracks are sometimes caused in the laminated polyester resin layer, and then it cannot be used for a can to be packed with a corrosive content. Also, in case where the planar orientation coefficient at the outermost layer is more than 0.10, the laminated resin film has an unsufficient extendability, then the cracks are sometimes caused in the laminated resin layer under the severe processing. Therefore, it is preferable in the resin laminated steel sheet of the present invention that the planar orientation coefficient at the outermost layer is kept within a range of 0.01 to 0.10 and that at the innermost layer is kept within a range of 0.00 to 0.05. Also, the lamination by the above described method (3) is suitable for the inside surface of a can where a corrosive content is packed. In that case, the control of the planar coefficient of the laminated resin film as described above is not necessary. The known adhesive can be applied, but a thermosetting resin containing an epoxy group in its molecular structure is preferable. It can be applied on the one side to be laminated to the steel surface of the resin film or both sides of the steel sheet.

The planar orientation coefficient defined as the orientation of the innermost and the outermost layer of the laminated polyester resin film is respectively determined by the following method. At first, the laminated polyester resin film is removed from the steel sheet by dipping the laminate into hydrochloric acid solution which only dissolves the steel sheet. After rinsing in water and drying the film, the refractive indexes in the lengthwise, the widthwise and the thickness directions of either side layer (the innermost and the outermost layer) of the polyester resin film are measured with a refractometer. Then, the planar orientation coefficient is determined according to the following equation, respectively.

$$A=(B+C)/2-D$$

where, A represents the planar orientation coefficient of the polyester resin film, B represents the refractive index in the lengthwise direction of the polyester resin film, C represents the refractive index in the widthwise direction of the polyester resin film, D represents the refractive index in the thickness direction of the polyester resin film.

The refractive indexes measured by the method described above show the average value within 5 $\mu$m from the outermost layer (of the either side of the resin film), then it is possible to divide the planar orientation coefficient in the innermost layer from that in the outermost layer.

In addition, in the present invention, the application of a biaxially oriented double layered film composed of an upper layer film and a lower layer film having different melting temperatures is also possible in order that the planar coefficient of the either side of the film can easily be controlled within a preferable range.

Furthermore, in the present invention, the intrinsic viscosity (IV value) of the polyester resin film is also one of the important factors. IV, which is in proportion to the molecular weight of the resin, greatly affects the stiffness and the formability of the resin film. In case where the resin film having IV less than 0.50, the resin layer on the drawn and ironed can has a poor impact resistance, even if the planar coefficient of the laminated resin film is kept within a preferred range, then the many micro cracks are caused in the polyester resin layer at the inside of the impacted area, and then the steel substrate is exposed. On the other hand, the resin film having IV more than 0.70 encounters a high viscous resistance during the ironing process, which sometimes causes practical problems.

In the present invention, the lamination of the pigmented thermoplastic resin film to the one side to be the outside of a can of a steel sheet is also an important factor from the artistic viewpoint. It is also possible to add white pigment based on titanium dioxide to the resin during the production of the resin in order to improve the print contrast of the design applied on the outside of a can. Inorganic or organic pigment, or that colored other than white can be used and be selected to the uses. The preferable print contrast can be obtained by the addition of 1 to 20%.

Furthermore, in the present invention, the other thermoplastic resin such as bisphenol A polycarbonate, one of polyamide resins selected from 6-nylon, 6,6-nylon, 6-6,6-co-polymer nylon, 6,10-nylon, 7-nylon and 12-nylon, and polyethylene naphthalate can also be applied. These resins can alone be used, or be co-extruded with other resins and be used as an upper layer or an intermediate layer of a double layered or a triple layered film. Also, a resin composed of an aforementioned polyester resin blended with these thermoplastic resins can be used. And also, a double layered film composed of an upper layer of aforementioned polyester resin and a lower layer of above-mentioned blended resin can be used. In some cases, additives such as antioxidant, stabilizer, antistatic agent, lubricant and corrosion inhibitor are added as far as it does not deteriorate other characteristics during the manufacturing process of the polyester resin used for the present invention.

As shown in FIG. 1 a steel sheet 1 to be laminated with a thermoplastic resin 2 is preferably ECCS having a double layered film 3 composed of an upper layer of hydrated chromium oxide of 5 to 25 mg/m$^2$ and a lower layer of metallic chromium of 30 to 200 mg/m$^2$. The center line average height of the surface roughness of the steel sheet is defined as 0.05 to 0.6 μm based on the adhesion to the thermoplastic resin and the corrosion resistance. When the center line average height of the surface roughness is more than 0.6 μm, the laminated thermoplastic resin sometimes peels off in the upper edge part of a can where the process intensity is heavier, then the upper limited 0.6 μm is defined. The lower limit of 0.05 μm is defined based not only on the performance but also on the difficulty to stably produced a steel sheet having a center line average height of the surface roughness less than 0.05 μm.

A lubricant 4 shown in FIG. 1 which volatilizes at a high temperature coated on the thermoplastic resin plays an important part when the dry forming, that is one of main ideas of the present invention, is carried out in the high production intensity and in the high speed. The lubricant is preferably that of which more than 50% volatilises when a formed can is heated for a few minutes at about 200° C. after forming, and selected from a simple substance of liquid paraffin, synthetic paraffin or natural wax, or a mixture of them due to the processing condition and the heating condition after forming. One having characteristics such as the melting temperature of 25 to 80° C. and the boiling temperature of 180 to 400° C. is preferably applied to the present invention. The coating weight, which should be defined based on the applied surface of a can (the inner or outer surface), the processing condition and the heating condition after forming, is preferably 5 to 100 mg/m$^2$, more preferably 30 to 60 mg/m$^2$.

In the above-mentioned manner, by the definition of the chemical composition, the mechanical and the physical properties of a steel sheet, and those of a thermoplastic resin, and the application of a lubricant which volatilizes at a high temperature on the thermoplastic resin, and so on, a steel sheet suitable for producing a can having a can height about twice the length of the can diameter and a thin wall thickness from 40 to 70% of the original sheet thickness can be obtained.

Figure 2A:
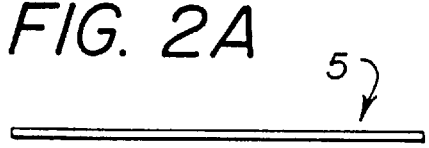
FIGS. 2A–2E are schematic views relating to a mode of the process wherefrom a can having a thin wall thickness is produced by dry forming from the resin laminated steel sheet of the present invention.
Figure 2B:
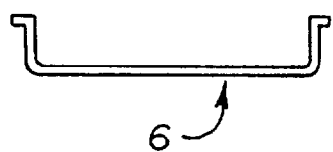
Figure 2C:
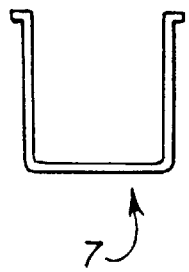
Figure 2D:
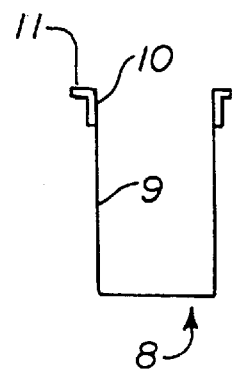
Figure 2E:
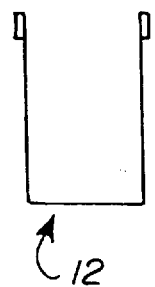
Figure 4:
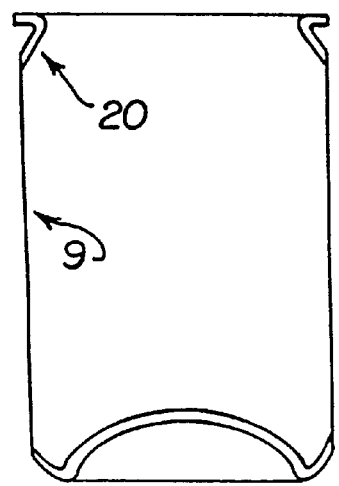
FIG. 4 shows a cross sectional drawing a can produced from the resin laminated steel sheet of the present invention.
Figure 5:
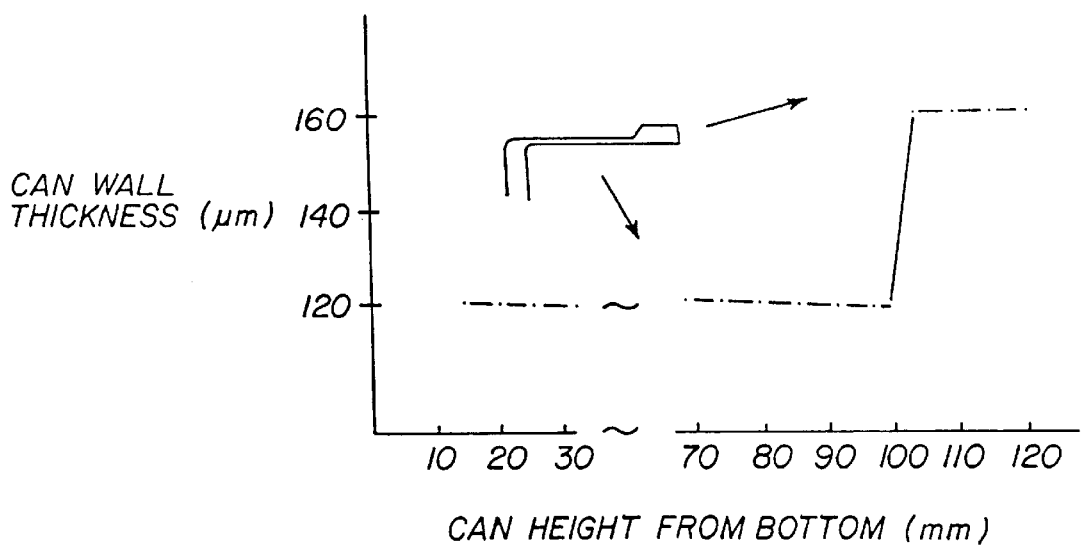
FIG. 5 shows a diagram showing a profile of a wall thickness of a can produced from the resin laminated steel sheet of the present invention.

The ironing process will now be explained. By the application of a composite process composed of a redrawing process and an ironing process at the same time to the thinning of a can wall thickness, the objective of the present invention can further effectively be performed. FIGS. 2A–2E show a mode of the composite process composed of a drawing and an ironing process suitable for producing a can having a thin wall and a high can height by dry forming from the resin laminated steel sheet of the present invention. At first, as shown in FIG. 2A, a blank 5 is punched out from a resin laminated steel sheet shown in FIG. 1. Then it is drawn into a drawn can 6 (FIG. 2B) and redrawn into a redrawn can 7 (FIG. 2C) having a smaller diameter than that of drawn can 6, and then it is redrawn and ironed at the same time (the composite process) into a redrawn and ironed can 8 (FIG. 2D) having a further smaller diameter than that of redrawn can 7. Subsequently, the upper edge part of a can 8 is trimmed off and shaped into a trimmed can 12 (FIG. 2E), then the upper edge part of a can 12 is processed by a neck-in and a flange forming, and then formed into a final can shown in FIG. 4. The composite process whose outline is shown in FIG. 3 plays an important role producing a can having a high can height and a thin wall thickness of the present invention. In the composite process, an ironing part 16 is provided behind a redrawing die 14 and the process is carried out by redrawing and ironing at the same time. By the ironing with the imposition of an effective back tension at the ironed part of the steel sheet, the resin layer to be the outside of a can is hardly damaged. The length L of the can wall 10 between the redrawing port and the ironing part is determined based on the gauge necessary for the next neck-in forming. Furthermore, it is effective for the present invention that the temperatures of the redrawing die 14 and the ironing die 15 are in the range from 25° C. to the glass transition temperature of the laminated resin. FIG. 5 shows an example profile of a wall thickness (the steel sheet alone after the laminated resin film is rejected) in the can height direction of a trimmed can 12 produced from a thermplastic resin laminated ECCS having an original sheet thickness of 0.20 mm under the process shown in FIG. 2. As shown in FIG. 5, the thickness of the can body is thinner (about 0.120 mm which is 60% of the original sheet thickness), and that of the upper part of it is thicker (about 80% of the original sheet thickness) and suitable for the next neck-in forming process. And as can clearly be seen from the process shown in FIG. 3, the stepped thickness difference between the body wall part 9 and the upper edge part 10 is more visibly formed on the outside of a can in contrast with the case of DWI having the step on the inside, so the shape of formed can is totally different from that of DWI. The process is described in greater detail in U.S. application Ser. No. 08/890,117 filed concurrently herewith.

The present invention is explained in further detail by the following examples.

EXAMPLE 1

6 kinds of steels whose chemical compositions were shown in TABLE 1 were melted in a converter and made into the slabs, then they were hot rolled and finished at the finishing temperature of 900° C. and coiled at the coiling temperature of 650° C., and then they were made into hot rolled sheets having a thickness of 1.8 mm. After being pickled, they were cold rolled and made into cold rolled sheets having thickness of 0.2 and 0.3 mm, and then they were annealed in the 2 types of the recrystallization annealing, respectively shown in TABLE 2 (CA: continuous annealing, BA: box annealing). Then, the steel sheets having a thickness of 0.20 mm were skin passed at the reduction rate of 1 to 2% (SR sheets), whilst those having a thickness of 0.3 mm were rolled to the thickness of 0.2 mm (DR sheets). SR and DR sheets were electrolytically treated in a chromate solution (metallic chromium: 120 mg/m$^2$ and hydrated chromium oxide: 18 mg/m$^2$ as chromium), then they were produced as 11 kinds of steel substrates to be laminated with thermoplastic resins. Then, these ECCS were laminated with thermoplastic resins as follows. At first, a biaxially oriented co-polyester resin film composed of 88 mole % of polyethylene terephthalate and 12 mole % of polyethylene isophthalate (thickness: 25 μm, orientation coefficient: 0.126 (on both sides of the film) and melting temperature: 229° C.) was laminated to the one side to be the inside of a can of these ECCS heated to 240° C., and a white colored biaxially oriented co-polyester resin film having the same chemical composition as the above-mentioned film pigmented with titanium dioxide (thickness: 20 μm) was laminated to the other side to be the outside of a can at the same time, and then they were immediately dipped into the water and cooled off. After the lamination, the laminates were dried and coated on both sides with paraffin based wax of about 50 mg/m$^2$, then they were processed as follows. At first, they were punched out into blanks having a diameter of 160 mm, then drawn into drawn cans having a diameter of 100 mm. Next, they were redrawn into redrawn cans having a diameter of 80 mm, and then they were processed into drawn and ironed cans having a diameter of 66 mm in the composite process composed of redrawning and ironing at the same time. The composite process was carried out under the conditions where the distance between the redrawing part and that of the ironing (the upper edge part of a can) was 20 mm, the corner radius of the redrawing die was one and a half as much as the sheet thickness, the clearance gap between the redrawing die and the punch was the same as the sheet thickness and the clearance gap between the ironing part and the punch was 55% of the original sheet thickness. During all the above-mentioned process, any water based cooling and lubricating agent was not applied and the dry forming was practiced in each process. The formed cans were evaluated relating to the break of a can wall, the appearance of the outside of a can, the metal exposure inside a can and adhesion of the laminated resin layer to ECCS substrate. In the composite process, the process proceeds along the arrow 18 direction shown in FIG. 3, where the forming was completed in the state that the flanged part was kept in the upper edge part of a can, then the processed can was rejected along the antiarrow direction by pulling back the punch 13. Then, the upper part of a can was trimmed off, processed by neck-in and flange forming, and then the finished can (FIG. 4), having a high can height and a thin wall thickness in the state that the can end could be seamed to it, was obtained. The formed cans were evaluated relating to the break of a can wall, the appearance of the outside of a can, the metal exposure inside a can and the adhesion of the laminated resin layer to ECCS substrate based on the following standards.

1) the break ratio of the can wall
   ◎ (excellent): 0%,
   ○ (good): <10%,
   Δ (fair): >10% or <30%,
   × (bad): >30%

2) the appearance of the outside of a can (evaluated by the formation ratio of the damage
   ◎ (excellent): 0%,
   ○ (good): <10%,
   Δ (fair): >10% or <30%,
   × (bad): >30%

3) the metal exposure inside a can (evaluated by the enamelrater value (ERV: mA)
   ◎ (excellent): >0 mA or <0.05 mA,
   ○ (good): >0.05 mA or <0.5 mA,
   Δ (fair): >0.5 mA or <5 mA,
   × (bad): >5 mA 4) the adhesion of the laminated resin layer after forming (evaluated by the peeling degree after neck-in forming)
   ◎ (excellent): no peeling,
   ○ (good): slightly peeled off but no problem for practical use,
   Δ (fair): visibly peeled off,
   × (bad): peeled off in the whole upper part of a can

EXAMPLE 2

The steel sheet C-1, C-2, D-1 and D-2 shown in TABLE 2 were electrolytically treated in a chromate solution in the same way as for Example 1 (metallic chromium: 75 mg/m$^2$ and hydrated chromium oxide: 13 mg/m$^2$ as chromium), then they were produced as the substrates to be laminated with thermoplastic resins. Then, a biaxially oriented co-polyester resin film composed of 88 mole % of polyethylene terephthalate and 12 mole % of polyethylene isophthalate (thickness: 12 μm, orientation coefficient: 0.126 (on both sides of the film) and melting temperature: 229° C.) was laminated to the one side to be the inside of a can of these ECCS heated to 240° C., and a white colored biaxially oriented co-polyester resin film having the same chemical composition as the abovementioned film pigmented with titanium dioxide (thickness: 12 μm) was laminated to the other side to be the outside of a can of them at the same time, and then they were immediately dipped into the water and cooled off. After the lamination, the laminates were dried and coated on both sides with paraffin based wax of about 50 mg/m$^2$, then they were processed in the same way as for Example 1, and then the formed cans were evaluated in the same way as for Example 1.

EXAMPLE 3

The steel sheet D-1 and D-2 shown in TABLE 2 were electrolytically treated in a chromate solution in the same way as for Example 1 (metallic chromium: 135 mg/m$^2$ and hydrated chromium oxide: 15 mg/m$^2$ as chromium), then they were produced as the substrates to be laminated with thermoplastic resins. Then, a biaxially oriented double layered co-polyester resin film composed of an upper co-polyester resin layer consisting of 88 mole % of polyethylene terephthalate and 12 mole % of polyethylene isophthalate and a lower co-polyester resin layer consisting of 94 mole % of polyethylene terephthalate and 6 mole % of polyethylene isophthtalate (thickness of upper layer film: 15 μm, that of lower layer film: 5 μm, melting temperature of upper later film: 220° C., that of lower layer film: 226° C., orientation coefficient of upper layer film: 0.123, that of lower layer film: 0.083) was laminated to the one side to be the inside of a can of ECCS heated to 235° C., and a white colored biaxially oriented co-polyester resin film having the same chemical composition as that for Example 1 pigmented with titanium dioxide (thickness: 15 μm) was laminated to the other side to be the outside of a can at the same time, and then they were immediately dipped into the water and cooled off. After the lamination, the laminates were dried and coated on both sides with paraffin based wax of about 50 mg/m$^2$, then they were processed in the same way as for Example 1, and then the formed cans were evaluated in the same way as for Example 1.

EXAMPLE 4

The steel sheet C-1, C-2, D-1 and D-2 shown in TABLE 2 were electrolytically treated in a chromate solution in the same way as for Example 1 (metallic chromium: 95 mg/m$^2$ and hydrated chromium oxide: 15 mg/m$^2$ as chromium), then they were produced as the substrates to be laminated with thermoplastic resins. Then, a biaxially oriented co-polyester resin film composed of 88 mole % of polyethylene terephthalate and 12 mole % of polyethylene isophthalate (thickness: 20 μm, orientation coefficient: 0.126 (on both sides of the film) and melting temperature: 229° C.), on which the one side to be laminated to ECCS was coated with an epoxy-phenol based primer in the dried weight of 0.5 mg/m², was laminated to the one side to be the inside of a can of ECCS heated to 240° C., and a white colored biaxially oriented co-polyester resin film having the same chemical composition as that for Example 1 pigmented with titanium dioxide (thickness: 15 μm) was laminated to the other side to be the outside of a can at the same time, and then they were immediately dipped into the water and cooled off. After the lamination, the laminates were dried and coated on both sides with paraffin based wax of about 50 mg/m², then they were processed in the same way as for Example 1, and then the formed cans were evaluated in the same way as for Example 1.

The evaluated results are shown in TABLE 3 and TABLE 4, then it can clearly be seen that the thermoplastic resin laminated steel sheet of the present invention is suitable for a can produced by dry forming and having a high can height and a thin wall thickness.

TABLE 1

| No. | A | B | C | D | E | F |
|---|---|---|---|---|---|---|
| C | 0.005 | 0.006 | 0.007 | 0.030 | 0.070 | 0.140 |
| Mn | 0.15 | 0.16 | 0.18 | 0.22 | 0.23 | 0.45 |
| Al | 0.055 | 0.053 | 0.057 | 0.060 | 0.055 | 0.063 |
| Si | 0.01 | 0.01 | 0.01 | 0.01 | 0.01 | 0.02 |
| P | 0.008 | 0.010 | 0.007 | 0.011 | 0.012 | 0.011 |
| S | 0.012 | 0.012 | 0.015 | 0.016 | 0.010 | 0.018 |
| Nb | 0.008 | 0.006 | — | — | — | — |
| Ti | — | 0.010 | — | — | — | — |

Remarks —: not added
(weight %)

TABLE 2

| No | A-1 | A-2 | B | C-1 | C-2 | D-1 | D-2 | D-3 | E-1 | E-2 | F |
|---|---|---|---|---|---|---|---|---|---|---|---|
| recryst annealing* | CA | CA | CA | CA | BA | CA | CA | CA | CA | BA | CA |
| SR or DR** | SR | DR | SR | SR | SR | SR | SR | DR | SR | DR | SR |
| crystal grain size (μm) | 19 | 19 | 18 | 21 | 33 | 10 | 10 | 10 | 8 | 12 | 5 |
| surface roughness (μm)*** | 0.15 | 0.16 | 0.14 | 0.22 | 0.21 | 0.18 | 0.80 | 0.19 | 0.21 | 0.15 | 0.16 |
| yield strength (kg/mm²) | 25 | 62 | 26 | 26 | 18 | 34 | 34 | 67 | 41 | 67 | 45 |
| tensile strength (kg/mm²) | 33 | 63 | 34 | 34 | 26 | 43 | 42 | 70 | 45 | 69 | 48 |
| aging index (kg/mm²) | 1.5 | 0.5 | 0.0 | 3.0 | 0.0 | 5.0 | 5.0 | 2.0 | 4.0 | 1.5 | 4.5 |

Remarks
*recryst. annealing: recrystallization annealing
**SR or DR: SR (skin passed at the reduction rate of 1 to 2%) or DR (rolled at the reduction rate of 33.3%)
***surface roughness: center line average height of surface roughness

TABLE 3

| Example No | Example 1 | | | | | | | | | | |
|---|---|---|---|---|---|---|---|---|---|---|---|
| No | A-1 | A-2 | B | C-1 | C-2 | D-1 | D-2 | D-3 | E-1 | E-2 | F |
| discrimination of examples | Example | Example | Example | Example | Comp. Example* | Example | Comp. Example* | Example | Example | Example | Comp. Example* |
| break of can wall | ⊚ | ○ | ⊚ | ⊚ | ○ | ○ | ○ | ○ | ○ | ○ | x |
| resin damage of outside | ⊚ | ○ | ⊚ | ⊚ | ○ | ○ | ○ | ○ | ○ | ○ | x |
| metal exposure of inside | ⊚ | ⊚ | ⊚ | ⊚ | Δ | ⊚ | Δ | ⊚ | ⊚ | ⊚ | ⊚ |
| adhesion (inside) | ○ | ○ | ○ | ○ | x | ⊚ | x | ⊚ | ⊚ | ⊚ | ⊚ |

Remarks
*Comp. Example: Comparative Example

TABLE 4

| Example No | Example 2 | | | | Example 3 | | Example 4 | | | |
|---|---|---|---|---|---|---|---|---|---|---|
| No | C-1 | C-2 | D-1 | D-2 | D-1 | D-2 | C-1 | C-2 | D-1 | D-2 |
| discrimination of examples | Example | Comp. Example* | Example | Comp. Example* | Example | Comp. Example* | Example | Comp. Example* | Example | Comp. Example* |
| break of can wall | ○ | ○ | ○ | ○ | ⊙ | ○ | ○ | ○ | ○ | ○ |
| resin damage of outside | ○ | ○ | ○ | ○ | ⊙ | ○ | ○ | ○ | ○ | ○ |
| metal exposure of inside | ○ | x | ○ | x | ⊙ | Δ | ⊙ | Δ | ⊙ | Δ |
| adhesion (inside) | ○ | x | ⊙ | x | ○ | x | ○ | x | ⊙ | x |

Remarks
*Comp. Example: Comparative Example

We claim:

1. Process for producing a can by dry forming, said process comprising the steps of:

providing a steel sheet which is electrolytically coated with chromium on both sides;

laminating said sheet on both sides with a thermoplastic resin having a thickness of 10 to 50 mm;

providing both sides of said thermoplastic resin laminated sheet with a lubricant having a melting temperature of 25 to 80° C. and a boiling temperature of 180 to 400° C. and of which more than 50% volatilizes when heated for a few minutes at about 200° C.; and forming a can by drawing and ironing said steel sheet having said lubricant on both sides thereof wherein said steel sheet contains carbon, manganese, aluminum, silicon, phosphorous, and sulfur in the following amounts by weight:

carbon: 0.001 to 0.10%
   manganese: 0.05 to 0.50%
   aluminum: 0.015 to 013%
   silicon: more than 0% and less than 0.05%
   phosphorous: more than 0% and less than 0.03%
   sulfur: more than 0% and less than 0.03% including a remainder of iron and inevitable impurities, and having the following characteristics:

| | |
   |---|---|
   | crystal grain size: | from 6 to 30 $\mu$m |
   | center line average height of the surface roughness: | 0.05 to 0.6 $\mu$m |
   | thickness: | 0.15 to 0.30 mm |

* * * * *